June 20, 1967 — D. U. HOWARD — 3,326,264
RESERVE FUEL SYSTEMS
Filed Nov. 5, 1964 — 2 Sheets-Sheet 1

DURRELL U. HOWARD
*INVENTOR.*

BY John C. Stahl

ATTORNEY

June 20, 1967　　　　D. U. HOWARD　　　　3,326,264
RESERVE FUEL SYSTEMS

Filed Nov. 5, 1964　　　　　　　　　　　　2 Sheets-Sheet 2

DURRELL U. HOWARD
*INVENTOR.*

BY *John C. Stahl*

ATTORNEY

3,326,264
RESERVE FUEL SYSTEMS
Durrell U. Howard, 306 Krameria Drive,
San Antonio, Tex. 78213
Filed Nov. 5, 1964, Ser. No. 409,218
5 Claims. (Cl. 158—46.5)

The present invention relates to reserve fuel systems for vehicles or the like and more particularly to such fuel systems including means to warn the operator that the fuel supply is nearing exhaustion.

At the present time, a conventional fuel gauge is not a fool-proof device to indicate the fuel supply in the tank of a vehicle or the like. In some cases, the gauge is inoperative and either gives no reading or does not give a true reading of the fuel supply. In many cases, however, the operator either inadvertently or completely ignores the fuel gauge and becomes aware of the fuel supply only after the vehicle has stopped and the fuel supply is completely exhausted.

The novel device of the subject invention relates to an auxiliary fuel tank that may be utilized in combination with the fuel system of currently-available vehicles or the like and in a modification of the invention relates to a main fuel tank including such novel device.

An object of the present invention is the provision of an auxiliary fuel tank including means to warn the motorist that the fuel supply is nearing exhaustion, said fuel tank containing sufficient fuel to enable the motorist to continue for a considerable distance.

Another object is to provide such a device including means to slow the speed of the vehicle as the fuel supply is nearing exhaustion thereby increasing the distance the vehicle may travel.

A further object of the invention is the provision of such a device which may be incorporated into the main fuel tank of a vehicle or the like.

Still another object of the present invention is the provision of a reserve fuel system which is extremely simple in construction, inexpensive to manufacture, capable of mass production techniques, and universal in its adaptability.

Other objects and features of the invention will become apparent to those skilled in the art as the disclosure is made in the following detailed description of preferred embodiments of the invention as disclosed in the accompanying sheets of drawing in which.

Figure 1:
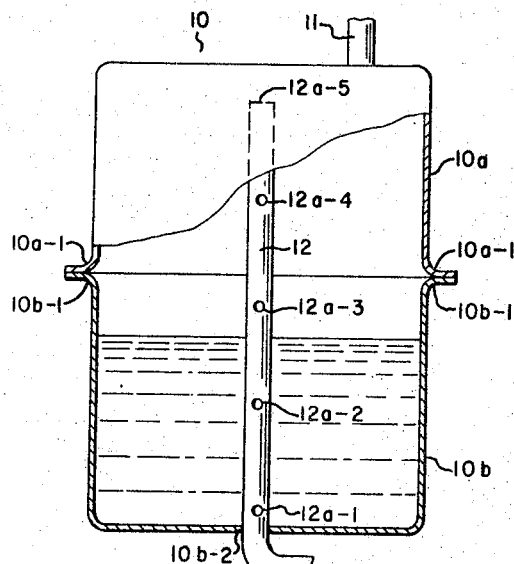
FIG. 1 is a side elevational view, partly in section, of a preferred embodiment of the invention.

Referring now to the drawings, wherein like reference characters designate like or corresponding parts throughout the several views, there is shown in the embodiment of FIG. 1 an auxiliary fuel tank 10, of any desired size, shape, and cross sectional configuration which in the embodiment illustrated consists of an upper section 10a with an outwardly turned flange 10a–1, and a lower section 10b with an outwardly turned flange 10b–1, said flanges 10a–1, 10b–1 are connected as by welding or the like to form a closed container. Tank 10 may be positioned in proximity to the main fuel reservoir (not shown) or at any desired position within the vehicle and secured in such postion in a conventional manner. A conduit 11 connects to the upper surface of section 10a and the main fuel reservoir, respectively. The bottom of the lower section 10b is provided with a bore 10b–2, at any desired position therein; an upstanding, hollow, cyindrical member 12 is passed through said bore in such a manner that the uppermost end 12a–5 is spaced from the undersurface of section 10a and the member 12 secured to the lower section, in a conventional manner. As will hereinafter be described in detail, a plurality of vertically spaced bores 12a–1—12a–4, of equal or of various diameters, are provided in the member 12. The portion of member 12 extending below the tank is connected to the engine of the vehicle as by means of a conduit or the like.

For purposes of convenience, the method of operation of such auxiliary fuel tank 10 will now be described, it being understood that the theory of operation applies essentially to each of the various embodiments and modifications of the invention hereinafter to be described.

When the auxiliary fuel tank 10 is filled with fuel, fuel enters the end 12a–5 of member 12 as well as through the bores 12a–1—12a–4, respectively, whereby the engine of the vehicle is supplied with its normal fuel requirements. When the main fuel tank (not shown) is empty, however, fuel will no longer continue to flow into the tank 10. Soon thereafter, when the fuel in such tank falls below the uppermost end 12a–5 of the member 12, only a reduced amount of fuel is available to the engine through bores 12a–1—12a–4; the operator of the vehicle is aware that he is on the reserve fuel supply since the engine often sputters and thereafter the vehicle's speed is limited to an ascertained, reduced speed. It is obvious that if the accelerator of the vehicle is fully depressed after this occurs the fuel-air ratio becomes too lean for normal combustion and the vehicle will slow down from the speed prior to such occurrence to a reduced speed, such speed being determined by the diameters of the respective bores 12a–1—12a–4 and the amount of fuel that the said bores allow to pass. It is understood that under these conditions the operator will modify the throttle setting until the fuel-air ratio becomes rich enough for normal operation at such reduced speed. When more fuel is consumed and the fuel level falls below the bore 12a–4, the amount of fuel flowing through the bores 12a–1—12a–3 is further limited and the engine receives still less fuel; however, such amount is sufficient for the engine to operate at a still further reduced speed. As the fuel level falls below each succeeding bore, still less fuel is available to the engine. It is to be understood that any number of such bores may be provided; furthermore, the diameters of such bores may be regulated whereby the fuel passed by the said bores will allow the engine to operate at a predetermined, reduced power and corresponding speed.

Figure 2:
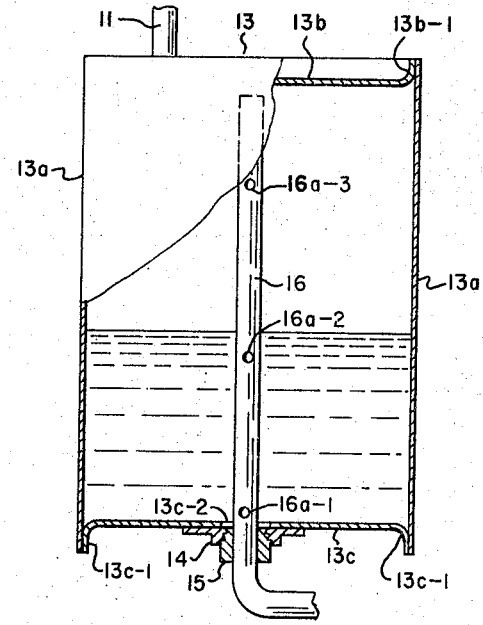
FIG. 2 is a side elevational view, partly in section, of a modification of the embodiment of FIG. 1.
Figure 3:
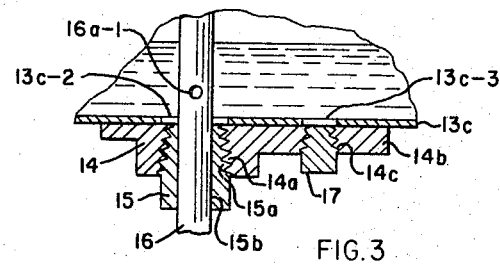
FIG. 3 is a fragmentary, enlarged, sectional view taken through the center of a modification of the embodiment of FIG. 2.

There is shown in FIG. 2 of the drawings another embodiment of the invention wherein the tank 13 consists of a cylinder 13a to which top and bottom members 13b–13c are secured. Preferably, each of said members includes an outwardly turned flange 13b–1, 13c–1, respectively, which are joined as by welding, to the ends of cylinder 13a to form a closed container. Conduit 11 connects to the top 13b and the main fuel reservoir (not shown); the bottom 13c is provided with a bore 13c–2 in any desired position. As best seen in FIG. 3, a boss 14, aligned with respect to the bore 13c–2, is connected to the bottom as by riveting or welding; the said boss includes a female threaded portion 14a which accommodates the corresponding male threaded member 15a of a tapered plug 15. An upstanding, hollow, cylindrical member 16, including vertically spaced bores 16a–1—16a–3, is constructed substantially as member 12 heretofore described; the said member 16 passes upwardly through a vertical bore 15b in plug 15 and is secured thereto as by sweating, brazing, or the like.

It is to be noted that the lowermost bores 12a–1, 16a–1, illustrated in FIGS. 1 and 2 of the drawings, are placed in proximity to the bottom of the tanks 10 and 13, respectively, whereby the entire fuel supply in the said tanks may be exhausted; alternatively, as shown in FIG. 3, the bore 16a–1 is spaced slightly above the bottom of the tank whereby any sediment or the like, found in the tank or fuel supply, may accumulate without plugging the lowermost bore. To allow for the removal of such sediment, a bore 13c–3 is provided in the bottom of the tank; the laterally extending flange 14b of the boss 14 includes a female threaded portion 14c aligned with respect to said bore 13c–3, and a plug 17 or the like threadingly inserts therein.

Figure 4:
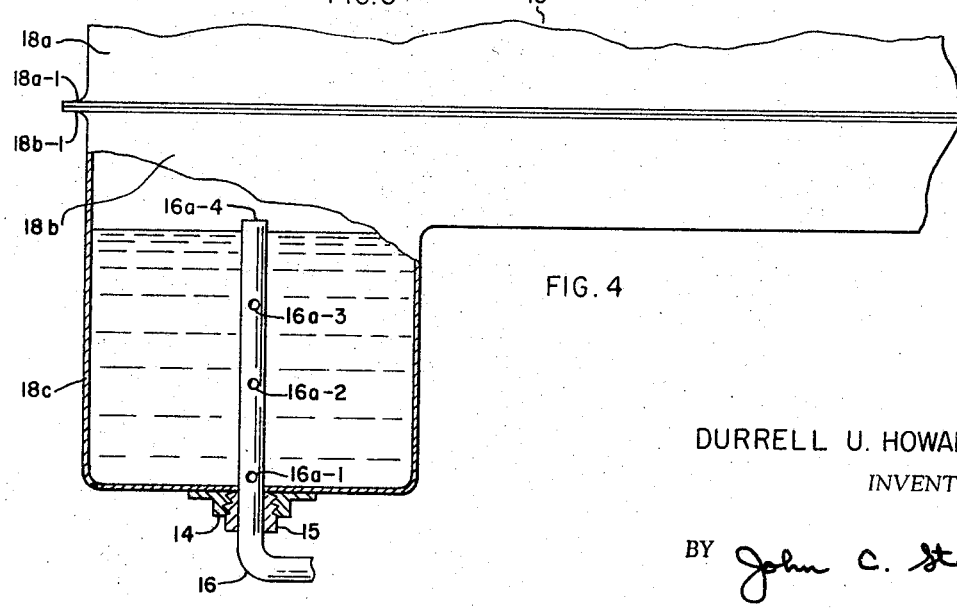
FIG. 4 is a fragmentary, side elevational view, partly in section, showing the invention incorporated in a main fuel tank.

There is shown in FIG. 4 of the drawings a main fuel tank 18 consisting of an upper section 18a with an outwardly turned flange 18a–1, and a lower section 18b with an outwardly turned flange 18b–1, said flanges are secured in any conventional manner to form a closed container. The lower section of such main fuel tank includes a sump 18c, of any desired size, shape, and fuel capacity. A hollow, vertically upstanding, cylindrical member 16, constructed in the manner heretofore described in connection with FIG. 2, is secured to the bottom of the sump with the uppermost end 16a–4 extending slightly into the main fuel tank. It is understood, of course, that the said member 16 may also be fixedly secured in such position in accordance with the teachings of FIG. 1.

Figure 5:
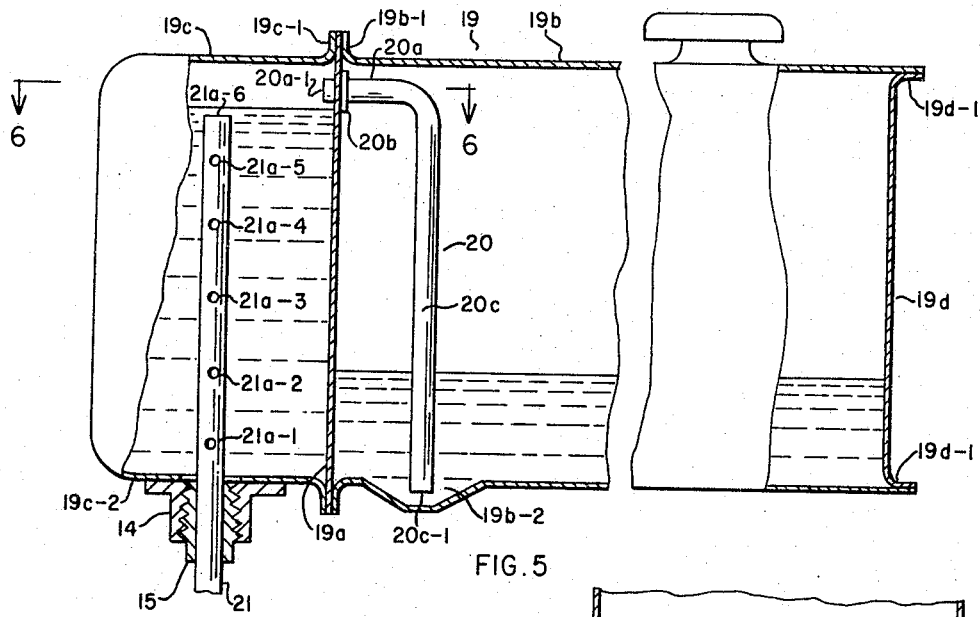
FIG. 5 is a side elevational view, partly broken away and partly in section, showing still another embodiment of the invention.
Figure 6:
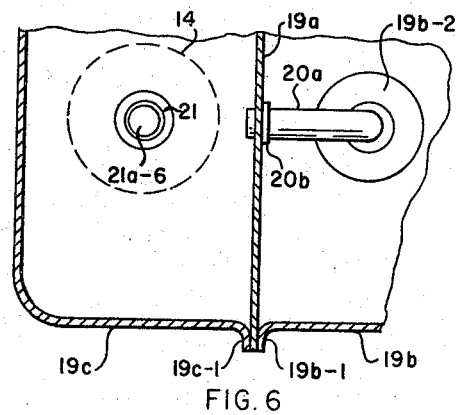
FIG. 6 is a sectional view taken on the line 6—6 of FIG. 5 looking in the direction of the arrows.

In FIG. 5 there is shown a further modification of the invention wherein the fuel tank 19 is separated by a divider 19a into a main and an auxiliary tank, 19b–19c, respectively. The main tank 19b is of any desired size, shape, and fuel capacity, and includes an outwardly turned flange 19b–1. A truncated, conical depression 19b–2 is provided in the bottom of said main tank, the purpose of which will hereinafter be more fully described. End 19d of said tank includes an outwardly turned flange 19d–1 which inserts into and is joined to the outermost end of tank 19b as by welding or the like.

The divider 19a is provided with a bore (not shown) in proximity to the uppermost edge thereof, and said bore is vertically aligned with respect to the depression 19b–2. An L-shaped, hollow, cylindrical member 20, consisting of a base 20a, a shoulder 20b secured thereto, and a downwardly depending portion 20c is secured to the said divider. More particularly, the outermost end of the base 20a is passed through the aforementioned bore in the divider and shoulder 20b is secured thereto as by welding or the like. The lower end 20c–1 of member 20 inserts into the depression 19b–2 whereby all fuel may be drained from the main tank into the auxiliary tank in the manner hereinafter to be described.

Auxiliary tank 19c is of the same cross sectional configuration as the main tank 19b and may be of any desired capacity; the said auxiliary tank terminates at one end in an outturned flange 19c–1. An upstanding, hollow, cylindrical member 21, including a plurality of vertically spaced bores 21a–1—21a–5, constructed in accordance with the principles heretofore described in connection with FIG. 2, is secured to the bottom 19c–2 of the auxiliary tank 19c; preferably, the uppermost end 21a–6 of said member 21 terminates below the bore 20a–1 of member 20 so that the fuel will not siphon from the auxiliary tank into the main tank.

The divider 19a is positioned between the flanges 19b–1, 19c–1 and joined thereto, in a conventional manner, thus forming sealed main and auxiliary tanks.

In such embodiment, the fuel pump of tthe vehicle (not shown), connecting to the downwardly depending portion of member 21 below the tank 19, causes a negative pressure within the auxiliary tank 19c so that the fuel in the main tank flows through member 20 into the auxiliary tank, filling the same.

Figure 7:
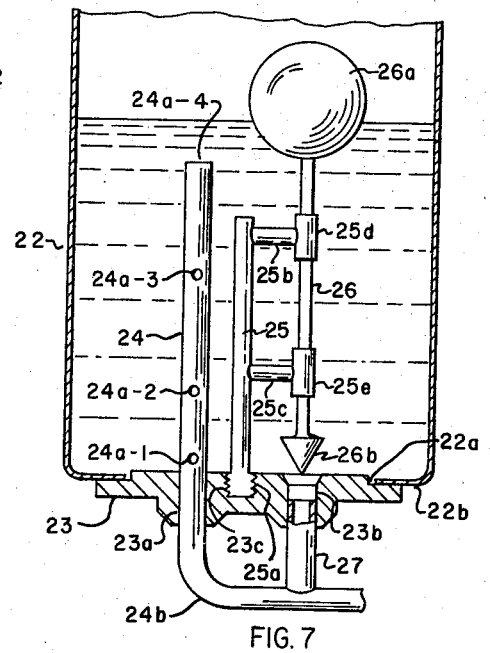
FIG. 7 is a side elevational view, partly in section, showing a further modification of the invention.

Referring now to the embodiment of FIG. 7, there is shown a fuel tank 22 of any desired size and shape, with an opening 22a provided in the bottom 22b thereof. A rectangular plate 23 partially inserts into said opening 22a and is secured to the bottom 22b of the tank in a conventional manner. Member 23 includes first and second vertical bores 23a–23b, respectively, and an intermediate female threaded portion 23c. An upstanding, hollow, cylindrical member 24, including spaced bores 24a–1—24a–3, passes upward through bore 23a and is secured to member 23 as by brazing, soldering, or the like. The mating male threaded member 25a on the lower end of a vertical standard 25 threadingly inserts into the female threaded portion 23c; the said standard includes first and second horizontally extending arms 25b–25c integrally formed therewith, which arms terminate in vertically aligned bushings 25d–25e. An elongated shaft 26 slidably passes through the said bushings 25d, 25e, said shaft terminating in a float 26a and a conically shaped valve 26b at the respective ends thereof. The second bore 23b is preferably beveled to provide a seat for the valve 26b. A conduit 27 inserts into the lower portion of bore 23b and is secured therein as by brazing, soldering, or the like. The conduit 27 connects to the downwardly depending portion 24b of member 24 which in turn connects to the engine of the vehicle. In such embodiment, when the tank 22 is full of fuel, the float 26a causes the valve 26b to remain open; as the fuel level continues to fall, however, the float 26a, riding on the surface thereof, eventually forces value 26b into the bore 23b. Thereafter the member 24 operates in the manner heretofore described. If sediment or the like is in the tank, it passes outward through the bore 23b without plugging the bores 24a–1—24a–3 in member 24.

Figure 8:
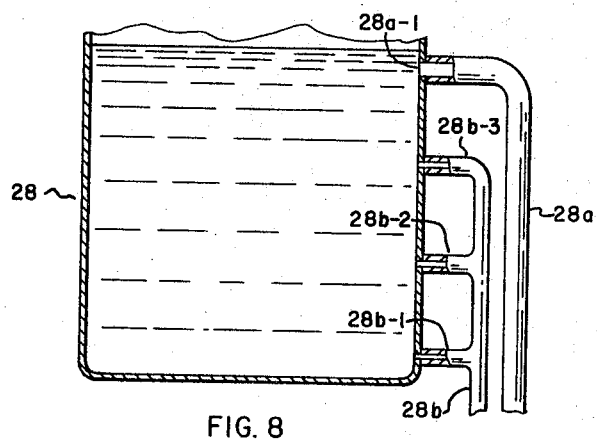
FIG. 8 is a side elevational view, partly in section, showing another modification of the invention.

In FIG. 8 of the drawings there is shown another modification of the of the invention. The fuel tank 28, in such embodiment, is of conventional design and is provided with first and second manifolds 28a–28b, said second manifold connecting to the said tank as by means of vertically spaced conduits 28b–1—28b–3. It is obvious that if the fuel level is above the bore 28a–1 of the first manifold 28a, fuel will pass thruogh both manifolds 28a, 28b to the engine, and the engine operates in a normal manner. As the fuel is exhausted and the fuel level falls below the bore 28a–1 of manifold 28a, a diminished supply of fuel is available to the engine. When the fuel level falls below the bore of conduit 28b–3, a still lesser amount of fuel passes through conduits 28b–1 and 28b–2; the engine can operate only at a further reduced speed under these conditions.

Although an upstanding, cylindrical member has been illustrated and described in connection with each of the figures, it is obvious that such member may be of any desired cross sectional configuration.

It is to be understood, of course, that the foregoing disclosure relates to only preferred embodiments of the invention and that it is intended to cover all changes and modifications of the invention herein chosen for the purposes of the disclosure, which do not constitute departures from the spirit and scope of the invention.

What is claimed is:

1. A reserve fuel supply system for an engine comprising in combination, a fuel tank, means for conducting fuel from said tank to said engine, said conducting means comprising a fuel feed line connecting said tank with said engine, and a large orifice permitting the flow of fuel from said tank to said fuel feed line only when the level of fuel in said tank is above a predetermined value, said large orifice being of sufficient size to provide a substantially unrestricted flow of fuel from said tank to said fuel feed line and thence to said engine, said fuel conducting means further including a plurality of additional orifices spaced at different levels within said tank and communicating with said fuel feed line, each of said plurality of additional orifices having an aperture permitting only a restricted flow of fuel through said fuel feed line to the engine and said plurality of orifices having a cumulative size which is less than that of said large orifice so as to permit only impaired operation of said engine when the level of fuel falls to a level preventing further flow through said large orifice, whereby when the level of fuel in said tank is above the level of said large orifice the engine receives an unrestricted flow of fuel but decreasing levels of said fuel below the level of said large orifice produce increasing impairment in operation of said engine each time the level of said fuel drops below the level of another one of said plurality of additional orifices.

2. The reserve fuel supply system of claim 1 in which said fuel conducting means comprises an upstanding pipe and said large orifice comprises the open upper end of said upstanding pipe, and said plurality of additional orifices comprises a plurality of small bores extending through the sidewall of said pipe to its interior.

3. The reserve fuel supply system of claim 1 in which said fuel tank comprises a hermetically sealed auxiliary tank and said system further includes a main fuel tank and means for transferring fuel from said main tank to said auxiliary tank.

4. The reserve fuel system of claim 1 in which one of said additional orifices is immediately adjacent the bottom of said tank.

5. The reserve fuel supply system of claim 1 in which said large orifice is substantially below the normal level of fuel in said tank and said fuel conducting means comprises means responsive to the level of fuel in said tank for opening said orifice only when said tank is substantially full of fuel.

References Cited
UNITED STATES PATENTS

| | | | |
|---|---|---|---|
| 1,248,172 | 11/1917 | Schuhmann | 158—46 |
| 2,734,561 | 2/1956 | Funkhouser | 158—46.5 X |

FOREIGN PATENTS 217,525 1/1910 Germany.

FREDERICK KETTERER, *Primary Examiner.*

ROBERT A. DUA, *Examiner.*